(12) United States Patent
Kim (10) Patent No.: US 11,057,214 B2
(45) Date of Patent: Jul. 6, 2021

(54) AUTHENTICATION APPARATUS USING VISUAL CRYPTOGRAPHY AND METHOD THEREOF

(71) Applicant: TOBESMART CO., LTD., Seongnam-si (KR)

(72) Inventor: Kwang Kim, Seongnam-si (KR)

(73) Assignee: TOBESMART CO., LTD., Seongnam-si (KR)

( * ) Notice: Subject to any disclaimer, the term of this patent is extended or adjusted under 35 U.S.C. 154(b) by 140 days.

(21) Appl. No.: 16/300,170

(22) PCT Filed: Dec. 14, 2016

(86) PCT No.: PCT/KR2016/014647
§ 371 (c)(1),
(2) Date: Nov. 9, 2018

(87) PCT Pub. No.: WO2017/209363
PCT Pub. Date: Dec. 7, 2017

(65) Prior Publication Data
US 2019/0149335 A1    May 16, 2019

(30) Foreign Application Priority Data
Jun. 3, 2016   (KR) .................. 10-2016-0069318

(51) Int. Cl.
*H04L 9/32*         (2006.01)
*G06F 21/43*        (2013.01)
(Continued)

(52) U.S. Cl.
CPC ............ *H04L 9/3234* (2013.01); *G06F 21/35* (2013.01); *G06F 21/36* (2013.01); *G06F 21/43* (2013.01);
(Continued)

(58) Field of Classification Search
CPC ............ G06F 21/36; G06F 2221/2103; G06F 2221/2133; G06F 21/84; H04L 9/085; H04L 9/3271
See application file for complete search history.

(56) References Cited

U.S. PATENT DOCUMENTS

2006/0018467 A1* 1/2006 Steinmetz .......... G06Q 20/4014
                                                  380/54
2006/0227969 A1* 10/2006 Johnson ................ G09G 5/12
                                                  380/210
(Continued)

FOREIGN PATENT DOCUMENTS

JP      2011-097192 A       5/2011
KR   10-2012-0096787 A      8/2012
WO   WO-2011052180 A1 *    5/2011  ............. H04L 9/32

OTHER PUBLICATIONS

Bharanivendhan et al, Visual Cryptography Schemes for Secret Image Sharing using GAS Algorithm, Apr. 2014, International Journal of Computer Applications (0975-8887), 6 Pages (Year: 2014).*

(Continued)

*Primary Examiner* — Christopher C Harris
(74) *Attorney, Agent, or Firm* — Paratus Law Group, PLLC (57) ABSTRACT

An authentication method using visual cryptography in a smart terminal, including: receiving, from an authentication server, a key image in which a user's individual cryptography string generated by the authentication server is separated; requesting user authentication from the authentication server; after requesting the user authentication, receiving, from a camera, an encrypted image shown on a display device; extracting an encrypted area from the received encrypted image; converting the extracted encrypted area to match with the key image in size and shape and overlaying (Continued)

the encrypted area with the key image pre-stored in the smart terminal; displaying an authentication code shown in an area where the encrypted area is overlaid with the key image and receiving the authentication code to transmit the authentication code to the authentication server; and after transmitting the authentication code, receiving an authentication result from the authentication server to provide the authentication result to the user.

14 Claims, 8 Drawing Sheets

(51) Int. Cl.
*H04L 9/08* (2006.01)
*G06F 21/35* (2013.01)
*H04W 12/00* (2021.01)
*G06F 21/36* (2013.01)
*G09C 5/00* (2006.01)
*H04L 29/06* (2006.01)

(52) U.S. Cl.
CPC ............... *G09C 5/00* (2013.01); *H04L 9/085* (2013.01); *H04L 9/3271* (2013.01); *H04L 63/0853* (2013.01); *H04W 12/00* (2013.01)

(56) References Cited

U.S. PATENT DOCUMENTS

| | | |
|---|---|---|
| 2009/0051776 A1* | 2/2009 | Wernersson ............. G02B 7/08 348/208.12 |
| 2009/0277968 A1 | 11/2009 | Walker |
| 2013/0039484 A1 | 2/2013 | Sun et al. |
| 2014/0177836 A1 | 6/2014 | Wu et al. |
| 2014/0341374 A1* | 11/2014 | Thozhuvanoor ...... H04L 9/0869 380/28 |
| 2016/0277443 A1* | 9/2016 | Anantharaju ........... G06F 21/41 |
| 2018/0285573 A1* | 10/2018 | Lantz .................... H04W 12/08 |

OTHER PUBLICATIONS

Kumar et al, User Authentication using Visual Cryptography, Nov. 2015, IEEE explore, 6 Pages (Year: 2015).*

Machizaud et al, Fourier-based automatic alignment for improved visual cryptography schemes, Oct. 2011, Optics Express, 14 Pages (Year: 2011).*

Chow et al, Enhancing the Perceived Visual Quality of a Size Invariant Visual Cryptography Scheme, 2012, Heidelberg (Year: 2012).*

Visual Cryptography, Naor et al., 1994, Springer, 12 pages (Year: 1994).*

International Search Report for PCT/KR2016/014647 dated Mar. 21, 2017 from Korean Intellectual Property Office.

* cited by examiner

FIG. 8

AUTHENTICATION APPARATUS USING VISUAL CRYPTOGRAPHY AND METHOD THEREOF

CROSS REFERENCE TO PRIOR APPLICATIONS

This application is a National Stage Patent Application of PCT International Patent Application No. PCT/KR2016/014647 (filed on Dec. 14, 2016) under 35 U.S.C. § 371, which claims priority to Korean Patent Application No. 10-2016-0069318 (filed on Jun. 3, 2016), which are all hereby incorporated by reference in their entirety.

BACKGROUND

The present invention relates to an authentication apparatus and a method thereof and, more particularly, to an authentication apparatus using visual cryptography and a method thereof.

Unless otherwise indicated herein, the disclosures in this section are not prior art to the claims of this application and are not to be construed as being prior art despite of the inclusion in this section.

Visual cryptography technology is provided to divide a single original image that is intended to be hidden into a number of encrypted images and infer a cryptography string contained in the original image only when a certain number or more of encrypted images are overlaid, thereby proving an advantage that a computer operation is not required for decryption. In the visual cryptography technology, the original image cannot be inferred from only each encrypted image.

Figure 1:
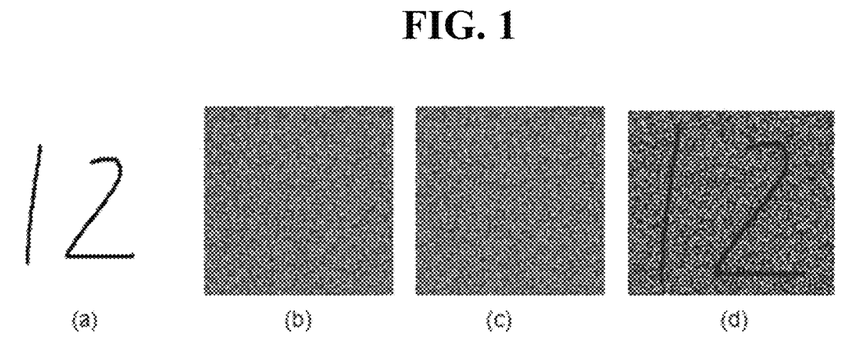
FIG. 1 is a view illustrating a visual cryptography technology.
Figure 2:
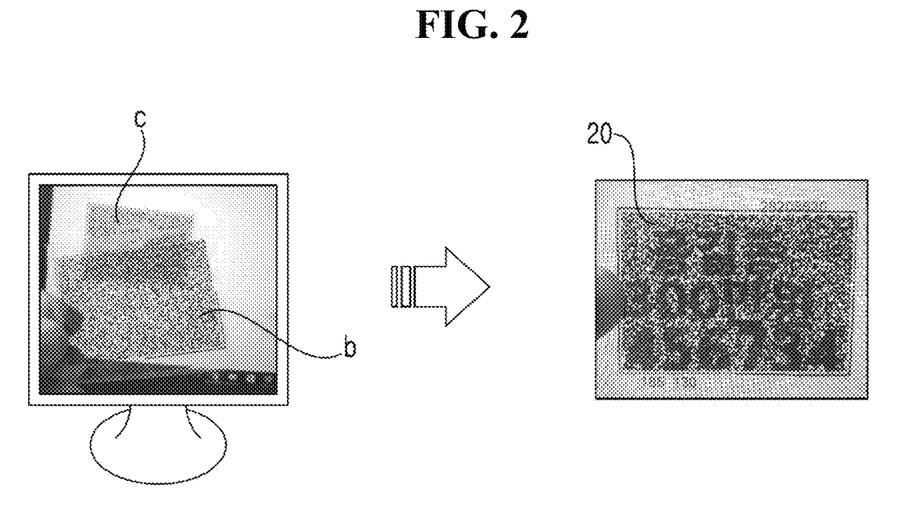
FIG. 2 is a view illustrating an example in which an authentication code is shown in an authentication process using a visual cryptography technology.

FIGS. 1 and 2 are views illustrating a visual cryptography technology.

Referring to FIG. 1, (a) is an original image including a cryptography string 12; (b) is an image provided to a user; (c) shows an image displayed on a smart phone or a computer of a user; and (d) is an image in which the cryptography string "12" is shown when the image (b) provided to the user and the image (c) displayed on a monitor of the smart phone or the computer are overlaid.

Hereinafter, a user authentication system using visual cryptography will be described in more detail. The certification authority randomly generates the image (b) of a predetermined size and outputs the generated image (b) to be provided to the user. When the user makes an authentication request to the certification authority using a computer or a smart phone, the certification authority generates the image (c) indicating an authentication code composed of numbers or character string for authentication and transmits the image (c) to the user. Hereinafter, as shown in FIG. 2, the user decrypts an authentication key with the image 20 generated as a result of overlaying the image (c) displayed on the smart phone or the monitor with the image (b) of her/his own and transmits the decrypting result to the authentication server, thereby completing authentication.

In this case, only in the case that the encrypted image (c) displayed on the screen of the user and the image (b) retained by the user are the same in size, decryption is enabled when the image (c) is overlaid with the image (b). Therefore, since the actual size of the image displayed on the screen is different according to the size of the monitor, it is required to perform a calibration process of the image displayed on the monitor. Also, in the authentication system using visual cryptography, a key image of a physical card owned by a user and an encrypted image displayed on a monitor have to be physically and precisely overlaid with each other to obtain a clear image necessary for decryption. Since the authentication key image of the physical card is of a physically defined size, and the encrypted image displayed on the monitor differs depending on a type of the monitor, fine adjustment is needed to be performed in the calibration process of adjusting the size. When the calibration process is not performed properly, the image may not be clear, thereby making it difficult to decrypt the cryptography string.

SUMMARY

Accordingly, the present invention has been made keeping in mind the above problems occurring in the prior art, and an object of the present invention is to provide a to a user authentication method using visual cryptography technology through image processing in a smart terminal and an apparatus therefor.

As an embodiment of the present invention, an authentication method using visual cryptography in a smart terminal includes receiving, from an authentication server, a key image in which a user's individual cryptography string generated by the authentication server is separated; requesting a user authentication from the authentication server; after requesting the user authentication, receiving, from a camera, an encrypted image shown on a display device; extracting an encrypted area from the received encrypted image; converting the extracted encrypted area to match with the key image in size and shape and overlaying the encrypted area with the key image pre-stored in the smart terminal; displaying an authentication code shown in an area where the encrypted area is overlaid with the key image and receiving the authentication code to transmit the authentication code to the authentication server; and after transmitting the authentication code, receiving an authentication result from the authentication server to provide the authentication result to the user.

As another embodiment of the present invention, an authentication method using visual cryptography in an authentication server includes generating a user's individual cryptography string and generating an encrypted image and a key image in which the generated cryptography string is separated; transmitting the generated key image to a smart terminal owned by a user and transmitting the encrypted image to a display device when receiving an authentication request; receiving an authentication code obtained by overlaying the encrypted image captured by the smart terminal with a key image pre-stored in the smart terminal, from the smart terminal; and comparing the received authentication code with the user's individual cryptography string and determining whether the user is authenticated or not according to the comparison result.

As another embodiment of the present invention, an authentication apparatus using visual cryptography, the apparatus includes a communication module receiving a key image in which a user's individual cryptography string generated by an authentication server is separated, from the authentication server and transmitting a user authentication request signal to the authentication server; an image processing module receiving an encrypted image displayed on a display device from a camera after transmitting the authentication request signal, extracting an encrypted area from the received encrypted image, and converting the extracted encrypted area in such a manner as to correspond to the key image to overlay the converted encrypted area with the key image pre-stored in a smart terminal; and a display module displaying an authentication code shown in an area where the encrypted area is overlaid with the key image.

As another embodiment of the present invention, an authentication server using visual cryptography, the server includes a generating module generating a user's individual cryptography string and generating an encrypted image and a key image in which the generated cryptography string is separated; a communication module transmitting the generated key image to a smart terminal owned by a user, transmitting the encrypted image to a display device when receiving an authentication request, and receiving, from the smart terminal, an authentication code obtained by overlaying the encrypted image captured by the smart terminal with the key image pre-stored in the smart terminal; and an authentication module comparing the received authentication code with the user's individual cryptography string to determine whether the user is authenticated or not according to the comparison result.

As another embodiment of the present invention, an authentication system using visual cryptography includes an authentication server generating a user's individual cryptography string to generate an encrypted image and a key image in which the generated cryptography string is separated, and transmitting the generated key image to a smart terminal owned by a user and the encrypted image to a display device when receiving an authentication request; a display device displaying the encrypted image received from the authentication server; and a smart terminal storing the key image received by the authentication server, extracting an encrypted area from the encrypted image when the encrypted image displayed on the display device is input via a camera, and displaying an authentication code obtained by overlaying the extracted encrypted area with the key image.

As described above, by applying the visual cryptography authentication technology to the smart terminal, it is possible to improve convenience through automated image calibration and to use the visual cryptography technology without a fear of exposure and loss of the encrypted image distributed to users.

DETAILED DESCRIPTION

As an embodiment of the present invention, an authentication method using visual cryptography in a smart terminal includes receiving, from an authentication server, a key image in which a user's individual cryptography string generated by the authentication server is separated; requesting a user authentication from the authentication server; after requesting the user authentication, receiving, from a camera, an encrypted image shown on a display device; extracting an encrypted area from the received encrypted image; converting the extracted encrypted area to match with the key image in size and shape and overlaying the encrypted area with the key image pre-stored in the smart terminal; displaying an authentication code shown in an area where the encrypted area is overlaid with the key image and receiving the authentication code to transmit the authentication code to the authentication server; and after transmitting the authentication code, receiving an authentication result from the authentication server to provide the authentication result to the user.

The advantages and features of the present invention and the manner of achieving them will become apparent with reference to the embodiments described in detail below with reference to the accompanying drawings. The present invention may, however, be embodied in many different forms and should not be construed as limited to the embodiments set forth herein. Rather, these embodiments are provided so that this disclosure will be thorough and complete, and will fully convey the concept of the invention to those skilled in the art, and the present invention is intended to be in all likelihood understood to fall within the scope of the invention. Like numbers refer to like elements throughout the description.

In the following description of the present invention, detailed description of known functions and configurations incorporated herein will be omitted when it may make the subject matter of the present invention rather unclear. The following terms are defined in consideration of the functions in the embodiments of the present invention, which may vary depending on the intention of the user, the operator, or the custom. Therefore, the definition should be based on the contents throughout this specification.

Figure 3:
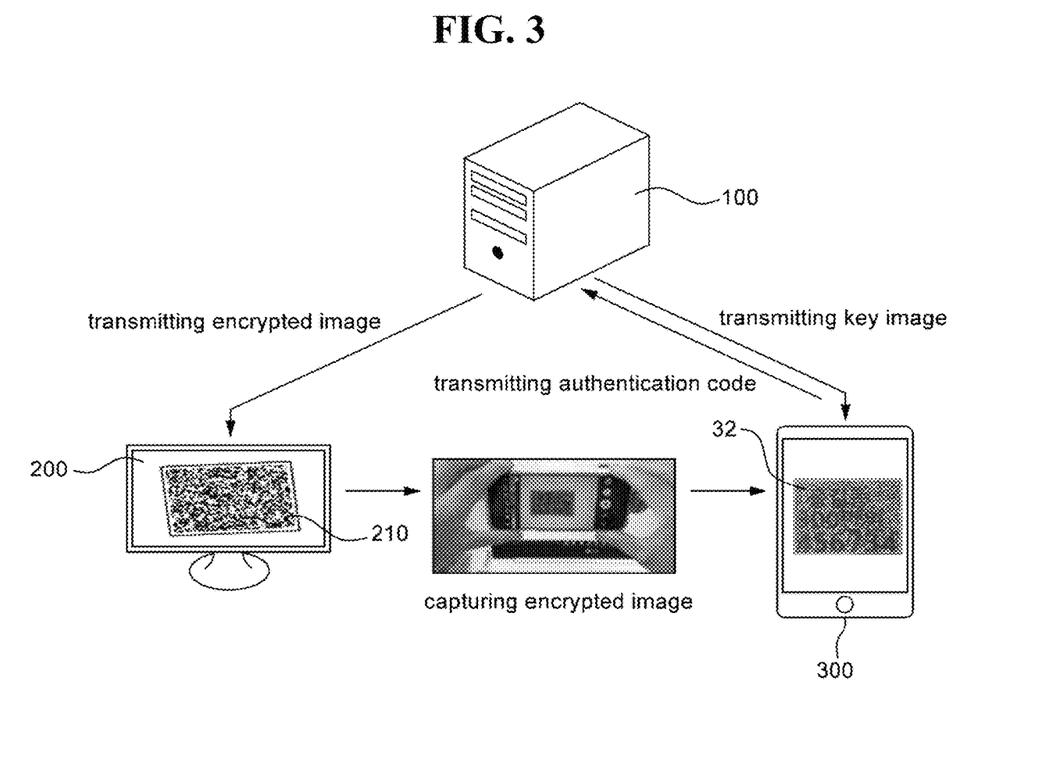
FIG. 3 is a view illustrating a configuration of an authentication system according to an embodiment of the present invention.

FIG. 3 is a view illustrating a configuration of an authentication system according to an embodiment of the present invention.

Referring to FIG. 3, an authentication system using visual cryptography technology may be configured to include an authentication server 100, a display device 200, and a smart terminal 300.

The authentication server 100 generates a user's individual cryptography string, encrypted image, and key image. The encrypted image and the key image are images obtained by dividing an original image including the user's individual cryptography string. Each of the encrypted image and the key image cannot infer the user's individual cryptography string. The authentication server 100 transmits the generated key image to the smart terminal 300 owned by the user and transmits the encrypted image 210 to the display device 200 when receiving an authentication request from the smart terminal 300 of the user. When the display device 200 displays the encrypted image received from the authentication server 100, the encrypted image is captured by the smart terminal 300. The smart terminal 300 extracts an encrypted area from the captured encrypted image. Thereafter, the authentication code 32 is displayed by causing the encrypted area extracted from the smart terminal 300 to be overlaid with the pre-stored key image. After the authentication code is displayed, the smart terminal 300 transmits the input authentication code to the authentication server 100, and the authentication server 100 compares the smart terminal 300 with the authentication code received from the smart terminal 300 with the user's individual cryptography string and then determines whether the user is authenticated or not according to the comparison result.

The display device 200 and the smart terminal 300 may be any one of a tablet PC, a laptop, a personal computer (PC), a smart phone, a personal digital assistant (PDA), a mobile communication terminal, and the like. That is, the terminal 300 refers to a terminal having a memory for storing a specific application that makes it possible to access the authentication server 100 via a wired/wireless communication network, a microprocessor for performing computation and control by executing the program, and the like. That is, the terminal 300 is any terminal as long as it is capable of performing a server-client communication with the authentication server 100, and includes, as a broad concept, all communication computing devices such as a notebook computer, a mobile communication terminal, a PDA, and the like.

Figure 4:
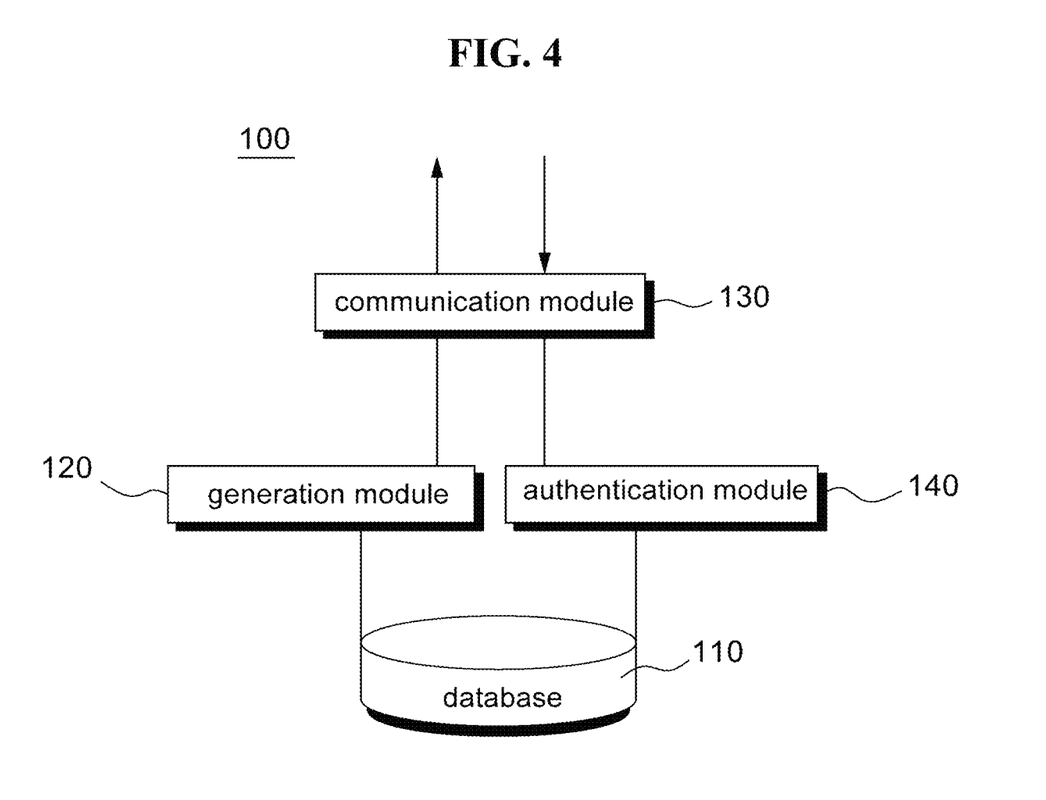
FIG. 4 is a block diagram depicting the configuration of an authentication server according to an embodiment of the present invention.

FIG. 4 is a block diagram depicting the configuration of an authentication server 100 according to an embodiment of the present invention.

Referring to FIG. 4, the authentication server 100 may include a database 110, a generation module 120, a communication module 130, and an authentication module 140.

The database 110 stores program data used for generating authentication program, communication data for transmitting the authentication program in a distributed manner, data necessary for overall performance of an authentication process disclosed herein such as customer's personal information and cryptography string data.

The generation module 120 generates a user's individual cryptography string, encrypted image, and key image. The encrypted image and the key image are images containing a certain portion of the user's individual cryptography string. Therefore, only the encrypted image and the key image cannot infer the user's individual cryptography string or authentication code, and the user's individual cryptography string may be decrypted only when the encrypted image is overlaid with the key image. According to an embodiment of the present invention, the encrypted image and the key image may be generated via an image encryption algorithm.

The communication module 130 receives the encrypted image and the key image data from the generation module 120, and transmits the encrypted image and the key image data to the display device 200 and the smart terminal 300. Specifically, the key image is transmitted to the smart terminal owned by the user, and the encrypted image is transmitted to the display device 200 when receiving an authentication request from the smart terminal 300.

In addition, when receiving the authentication request, the communication module 130 transmits the authentication request to the generation module 120, and then receives the key image and the encrypted image generated at the time of receiving the authentication request, from the generation module 120. The key image is then transmitted to the smart terminal 300 and the encrypted image is transmitted to the display device 200. According to an embodiment of the present invention, the authentication server 100 may generate the key image at the time of receiving the authentication request and transmit the key image to the smart terminal 300, thereby preventing a security problem that may be occurred by storing the key image in the smart terminal 300.

The authentication module 140 compares the authentication code received from the smart terminal 300 with the user cryptography string generated by the generation module 120, and then determines whether the user is normally authenticated or not according to the comparison result.

Figure 5:
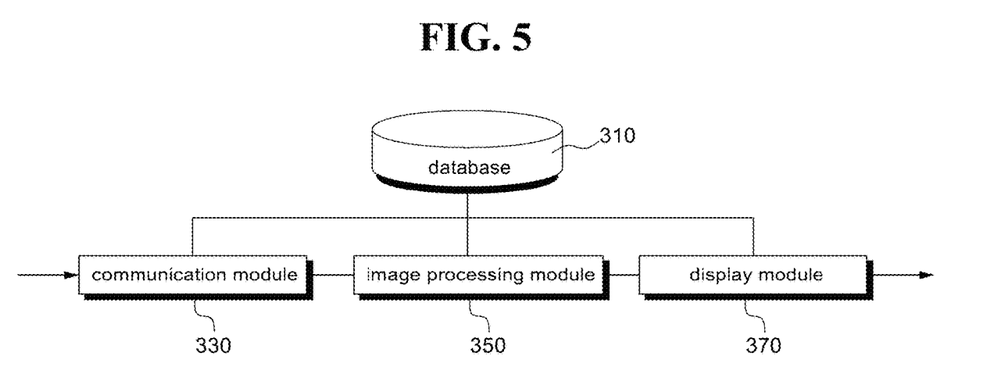
FIG. 5 is a block diagram depicting a configuration for operating authentication program in a smart terminal according to an embodiment of the present invention.

FIG. 5 is a block diagram depicting a configuration for operating authentication program in a smart terminal according to an embodiment of the present invention.

Referring to FIG. 5, the smart terminal 300 may be configured to include a database 310, a communication module 330, an image processing module 350, and a display module 370. The term 'module' used herein, should be interpreted to include software, hardware, or a combination thereof, depending on the context in which the term is used. For example, the software may be machine language, firmware, embedded code, application software, or a programming language. As another example, the hardware may be a circuit, a processor, a computer, an integrated circuit, an integrated circuit core, a sensor, a micro-electro-mechanical system (MEMS), a passive device, or a combination thereof.

The database 310 stores a series of data necessary for image detection and communication processes, including authentication program data received from the authentication server 100.

The communication module 330 receives the key image from the authentication server 100 and transmits an authentication request signal to the authentication server 100. The key image is an image including a portion of the user's individual cryptography string generated by the authentication server 100. Only the key image cannot infer a user's individual cryptography string.

After the authentication request signal is transmitted, the image processing module 350 receives the encrypted image displayed on the display device 200 through the camera capturing, and extracts an encrypted area from the received encrypted image. Thereafter, the extracted encrypted area is converted so as to match with the key image in size and shape, and the converted encrypted area and the pre-stored key image are overlaid to correspond to each other.

In an embodiment of the present invention, when the user captures the encrypted image and then stores the image, the image processing module 350 performs the encrypted area extraction and conversion processes from the stored encrypted image. Alternatively, the image processing module 350 may also extract the encrypted area when the user does not store the captured image. For example, when a camera provided with the smart terminal is operated so that the encrypted image of a subject is projected onto the screen of the smart terminal via capturing, the image processing module 350 performs autofocusing on the encrypted image displayed on the projected screen. Once the focal point of the encrypted image is detected, the encrypted area may be extracted on the basis of the focal point and then be immediately overlaid with the key image pre-stored in the smart terminal 300, whereby the authentication code may be provided. In the embodiment described, even if the captured encrypted image is not stored, the user may decrypt the authentication code so that the possibility of leakage of the encrypted image is eliminated in the beginning, thereby further improving the security. In addition, since the displayed authentication code is provided only to the user at the time of authentication, the risk of cryptography string leakage may be greatly reduced.

The display module 370 displays an area in which the encrypted area and the key image are overlaid to correspond to each other, to make it possible for the user to decrypt his/her authentication code.

Figure 6A:
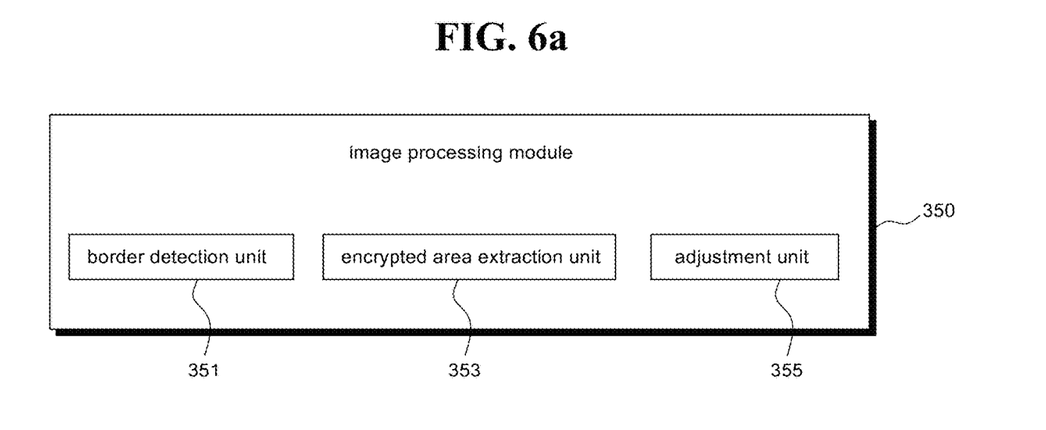
FIG. 6a is a block diagram depicting a more specific configuration of the image processing module according to an embodiment of the present invention.

FIG. 6a is a block diagram depicting a more specific configuration of an image processing module 350 according to an embodiment of the present invention;

Referring to FIG. 6a, the image processing module 350 may include a border detection unit 351, an encrypted area extraction unit 353, and an adjustment unit 355.

The border detection unit 351 performs edge detection and corner detection on the encrypted area in the encrypted image received from the camera. For example, the border detection unit 351 may perform edge detection and corner detection on the encrypted area in the encrypted image using various edge detection algorithms such as Laplacian masking, color detection, and color change detection. The border detection unit 351 may also detect a figure balance state after performing the edge detection and the corner detection. The figure balance state may include slope, rotation, and warping of the edge of the extracted encrypted area. The border detection unit 351 detects the figure balance state and may calibrate the figure balance state of the detected encrypted area into the figure balance state of the key image. Thus, even if the rotated or twisted encrypted image is input to the smart terminal 200 due to a capturing error, it is possible to extract the encrypted area without image detection error.

The encrypted area extraction unit 353 connects all the edges and corners that are detected by the border detection unit 351, and filters an outer area of the connected edges and corners. The encrypted area extraction unit 353 extracts only an inner area of the connected edges and corners as the encrypted area. The adjustment unit 355 performs scaling so that the extracted encrypted area matches with the pre-stored key image in size and shape. Thereafter, the adjustment unit 355 is provided such that the authentication code is shown in an area in which the key image and the encrypted area having the same size and shape are overlaid to correspond to each other.

Figure 6B:
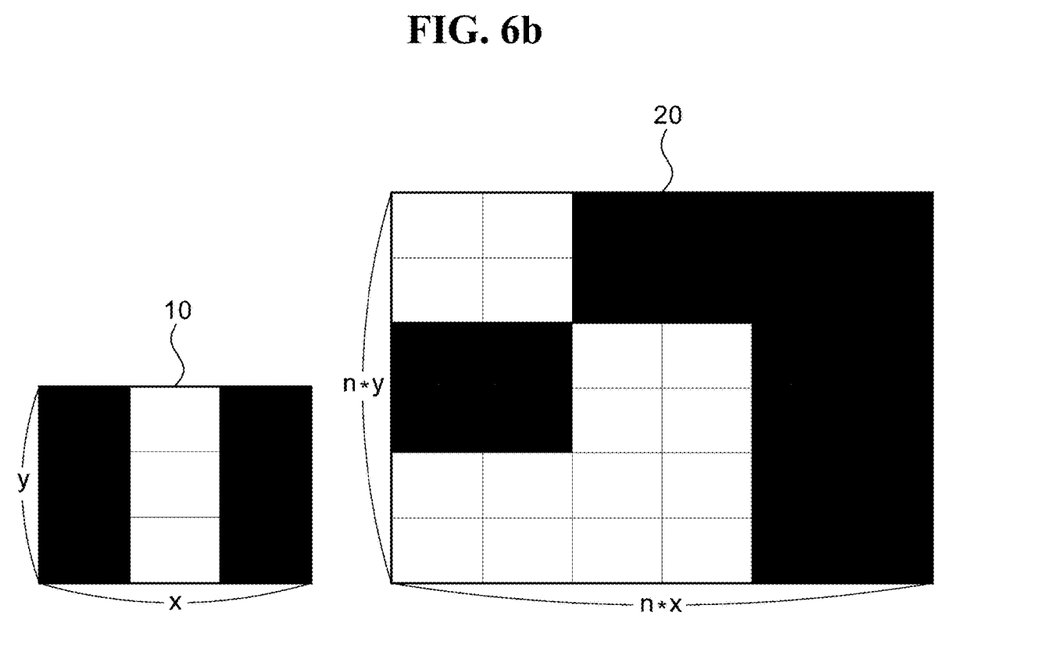
FIGS. 6b to 6c are views illustrating an embodiment for generating an image or an encrypted image.
Figure 6C:
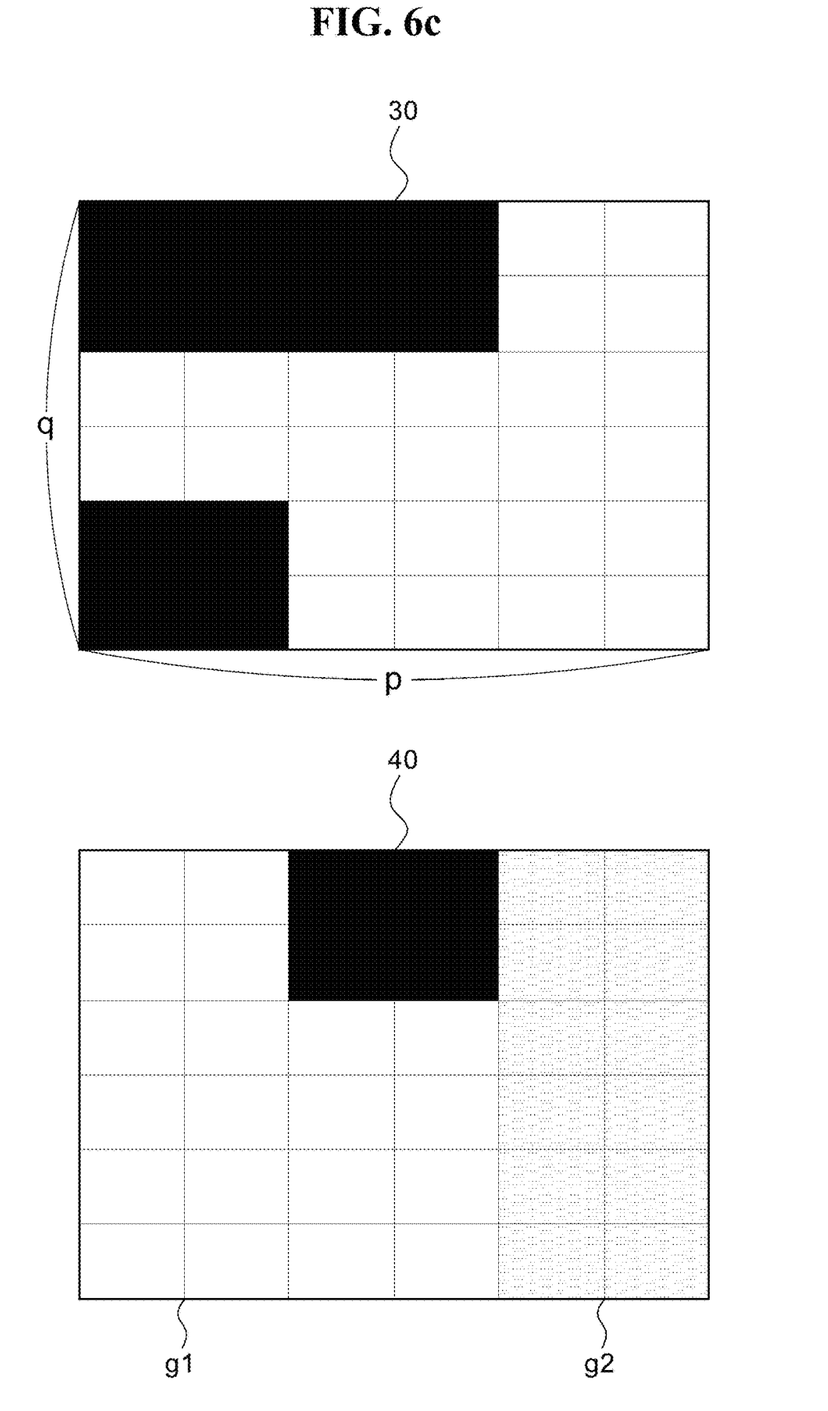

FIGS. 6b to 6c are views illustrating an embodiment for generating an image or an encrypted image.

Referring to FIG. 6b, the image processing module 350 generates an original image 20 obtained by scaling an image 10 composed of X unit grids in width and Y unit grids in length by n (n=integer) times. Thereafter, the scaled original image 20 may be divided into grids of a size (n, n), and each of the divided grids is randomly filled with black or white, thereby generating a user key image (a).

In order to describe another example, referring to FIG. 6c, the image processing module 350 randomly assigns black or white to each pixel of an image composed of p pixels in width and q pixels in length, thereby generating the user key image (a) 30.

Hereinafter, the authentication method will be described. Since the function of the authentication method is essentially the same as the function on the authentication apparatus, a description overlapping with those of FIGS. 1 to 6C will be omitted.

Figure 7:
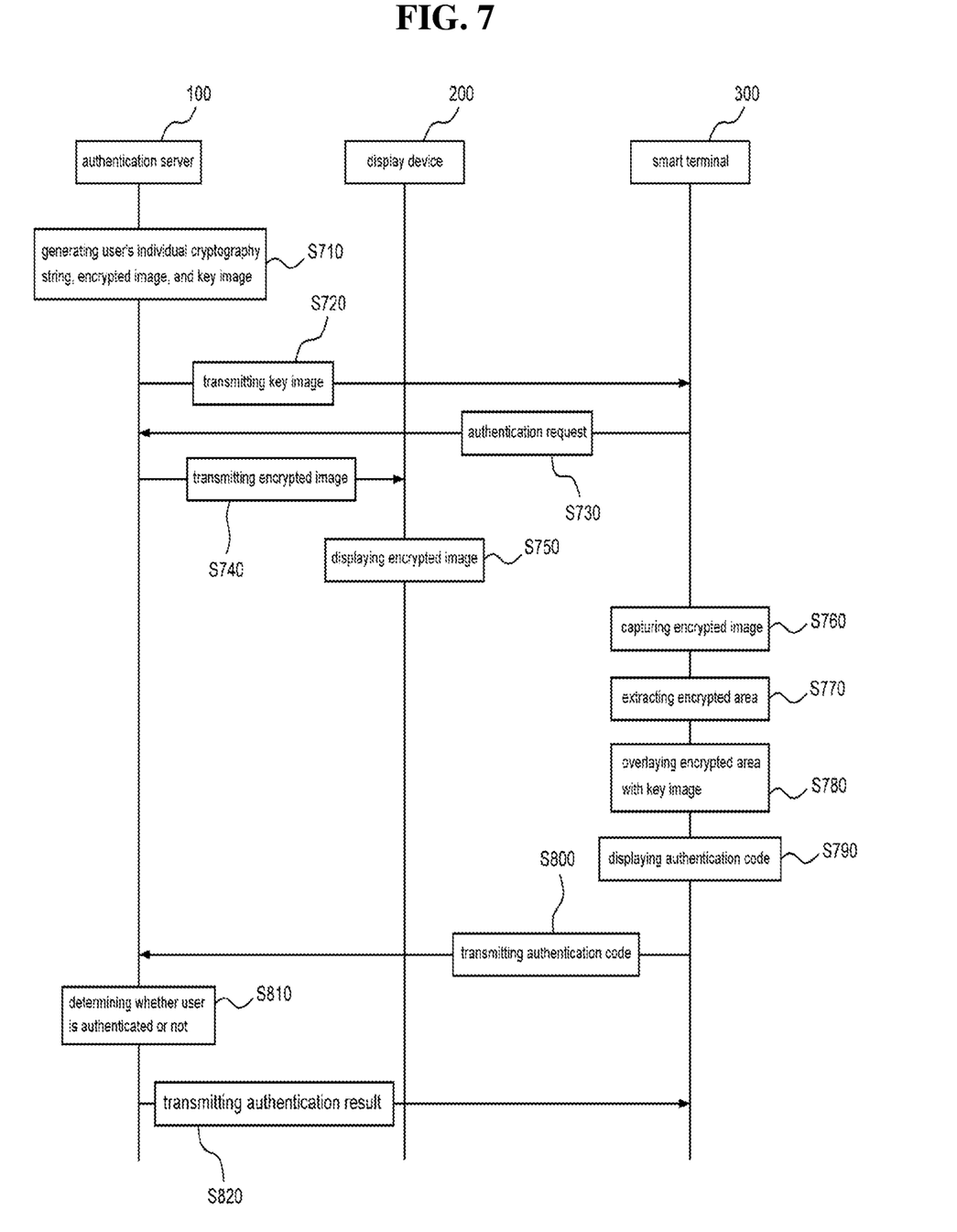
FIG. 7 is a signal flowchart of an authentication system according to an embodiment of the present invention.

FIG. 7 is a signal flow chart of an authentication system according to an embodiment of the present invention.

In step S710, a process is performed in which the authentication server 100 generates a user's individual cryptography string, encrypted image, and key image for the purpose of user authentication. In step S720, the generated key image is transmitted to the smart terminal 300, and in step S730, the smart terminal 300 transmits an authentication request signal to the authentication server 100 according to user input.

In step S740, the authentication server 100 transmits the encrypted image to the display device 200. In step S750, the display device 200 displays the encrypted image received from the authentication server 100.

In step S760, the smart terminal 300 captures the encrypted image displayed on the display device 200. In step S770, an encrypted area included in the encrypted image captured by the smart terminal 300 is extracted.

In step S780, the detected encrypted area is converted to match with the key image in shape and size, and the converted encrypted area and the key image are overlaid to correspond to each other.

In step S790, an authentication code is shown in an area where the encrypted area and the key image are overlaid. In step S800, the authentication code received from the smart terminal 300 is transmitted to the authentication server 100.

In step S810, the authentication server 100 compares the authentication code received from the smart terminal 300 with the user's individual cryptography string and then determines whether the user is authenticated or not.

In step S820, the authentication result is transmitted to the smart terminal 300.

Figure 8:
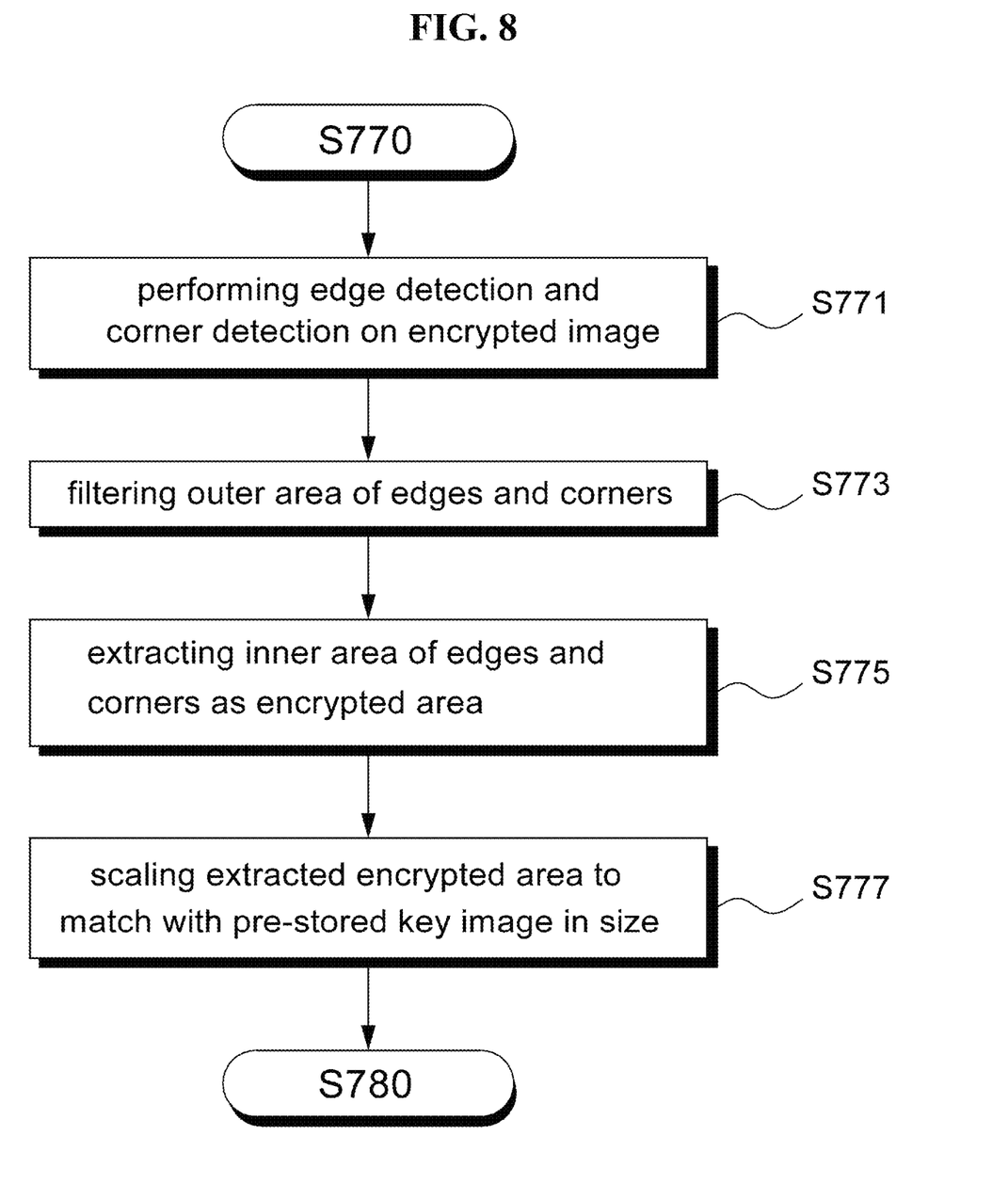
FIG. 8 is a flowchart more specifically illustrating an encrypted area extracting process according to an embodiment of the present invention.

FIG. 8 is a flowchart illustrating an encrypted area extracting process according to an embodiment of the present invention.

In step S771, a border line detection unit 351 performs edge detection and corner detection on the encrypted area in the encrypted image input from the camera. Step S771 includes detecting a figure balance state including slope, rotation, and warping of the edge after detecting the edges and corners; and performing calibration in such a manner as to make the figure balance state of the detected encrypted area be the same as the figure balance state of the key image.

In step S773, the encrypted area extracting unit 353 connects all the detected edges and corners and filters an outer area of the connected edges and corners, and in step S775, the encrypted area extracting unit 353 extracts an inner area as an encrypted area.

In step S777, the extracted encrypted area is scaled so that the extracted encrypted area matches with the pre-stored key image in shape and size. Then, the corner of the key image corresponds to the corner of the encrypted area, or the border line of the key image corresponds to the border line of the encrypted area so that the authentication code is shown in an area where the encrypted area and the key image are overlaid.

The authentication server using visual cryptography and the method thereof disclosed therein can perform user authentication using visual cryptography without the operation processing required for the image calibration process, thereby improving data processing efficiency. It will be understood by those skilled in the art that the contents herein is just described as an example and various changes in form and details may be made therein without departing from the spirit and scope of the invention as defined by the appended claims.

When the visual cryptography authentication technology is used for the smart terminal for, it can reduce the possibility of loss and exposure of media in which an authentication cryptography string such as the encrypted image and the security card is included, thereby improving the security of financial transaction and electronic transaction online.

The invention claimed is:

1. An authentication method using visual cryptography in a smart terminal, the method comprising:
 receiving, from an authentication server, a key image obtained by dividing, by an authentication server, an original image including a user's individual cryptography string generated by the authentication server such that the key image contains only a portion of the user's individual cryptography string;

requesting a user authentication from the authentication server;

after requesting the user authentication, receiving, from a camera, an encrypted image shown on a display device;

extracting an encrypted area from the received encrypted image by detecting corners and edges included in the encrypted image using an edge detection algorithm including Laplacian masking, color detection, and color change detection;

converting the extracted encrypted area to match with the key image in size and shape and overlaying the encrypted area with the key image pre-stored in the smart terminal;

displaying an authentication code shown in an area where the encrypted area is overlaid with the key image and receiving the authentication code to transmit the authentication code to the authentication server; and after transmitting the authentication code, receiving an authentication result from the authentication server to provide the authentication result to the user, wherein the extracting the encrypted area includes:
 detecting slope, rotation, and warping of the detected corners and edges;
 calibrating the slope, the rotation, and the warping of the detected corners and edges into slope, rotation, and warping of the key image;
 detecting calibrated corners and edges in the encrypted image input from the camera according to a result of the calibration;
 connecting all of the calibrated corners and edges; and
 extracting only an inner area of the connected corners and edges as an encryption area by filtering an outer area of the connected edges and corners.

2. The method of claim 1, wherein the overlaying the extracted encrypted area with the key image pre-stored in the smart terminal includes:
 scaling the extracted encrypted area in such a manner as to be same as the pre-stored key image in shape and size; and
 corresponding a corner of the key image to a corner of the encrypted area or a border line of the key image to a border line of the encrypted area.

3. The method of claim 1, wherein the receiving, from the camera, the encrypted image shown on the display device includes:
 extracting the encrypted area by performing autofocusing on the received encrypted image; and
 displaying the authentication code by overlaying the extracted encrypted area with the pre-stored key image.

4. The method of claim 1, wherein transmitting the encrypted image to the smart terminal is performed by extracting an authentication key each time an authentication request message is received from the authentication server, and
 wherein the method further comprises:
 when the key image is overlaid with the encrypted image on the basis of a pattern of grids composing the key image provided to a user, generating the encrypted image in which the extracted authentication key is shown by overlaying the pattern of grids with each other; and
 transmitting the encrypted image to the smart terminal of the user.

5. The method of claim 1, wherein the encrypted image is obtained by dividing, by the authentication server, the original image such that the encrypted image contains only another portion of the user's individual cryptography string different than the portion.

6. An authentication apparatus using visual cryptography, the apparatus comprising:
 a communication module configured to receive, from an authentication server, a key image obtained by dividing, by an authentication server, an original image including a user's individual cryptography string generated by the authentication server such that the key image contains only a portion of the user's individual cryptography string, and transmit a user authentication request signal to the authentication server;
 an image processing module configured to receive an encrypted image displayed on a display device from a camera after transmitting the user authentication request signal, extract an encrypted area from the received encrypted image by detecting corners and edges included in the encrypted image using an edge detection algorithm including Laplacian masking, color detection, and color change detection, and convert the extracted encrypted area in such a manner as to correspond to the key image to overlay the converted encrypted area with the key image pre-stored in a smart terminal; and
 a display module configured to display an authentication code shown in an area where the encrypted area is overlaid with the key image,
 wherein the image processing module includes:
  a border detection unit configured to extract the encrypted area by detecting slope, rotation, and warping of the detected corners and edges, calibrate the slope, the rotation, and the warping of the detected corners and edges into slope, rotation, and warping of the key image, and detect calibrated corners and edges in the encrypted image input from the camera according to a result of the calibration; and
  an encrypted area extracting unit configured to connect all of the calibrated edges and corners, and extract only an inner area of the connected corners and edges as an encryption area by filtering an outer area of the connected edges and corners
 wherein the communication module, the image processing module, the display module, the border detection unit, and the encrypted area extracting unit are each implemented via at least one processor.

7. The apparatus of claim 6, wherein the image processing module further includes:
 an adjustment unit configured to convert a shape of the extracted encrypted area and scaling a size of the extracted encrypted area so that the extracted encrypted area is same as the pre-stored key image in shape and size and, so that a corner of the key image and a corner of the encrypted area correspond to each other and a border line of the key image and a border line of the encrypted area correspond to each other,
 wherein the adjustment unit is implemented via at least one processor.

8. The apparatus of claim 6, wherein, when the camera of the smart terminal is operated so that the encrypted image of the display device is detected by the camera as an object, the image processing module extracts the encrypted area by performing autofocusing on the encrypted image detected by the camera and overlays the extracted encrypted area with the pre-stored key image, thereby providing the authentication code to a user.

9. The apparatus of claim 6, wherein the image processing module scales an original image composed of X unit grids in width and Y unit grids in length and including an authentication key capable of being decrypted, by n (n=integer) times and divides the scaled original image into grids of a size (n, n), and filling each of the divided grids randomly with black or white, in order to generate the key image, or assigns black or white randomly to each pixel of the original image composed of p pixels in width and q pixels in length, in order to generate the key image.

10. The apparatus of claim 9, wherein a pattern of grids and pixels composing the encrypted image is configured differently from a pattern of grids and pixels composing the key image, and the image processing module extracts the authentication key by overlaying the pattern of grids and pixels included in the encrypted image with the pattern of grids and pixels included in the key image when the encrypted image is overlaid with the key image provided to the user.

11. An authentication system using visual cryptography, the system comprising:
 an authentication server configured to generate a user's individual cryptography string, divide an original image including the generated cryptography string to generate an encrypted image and a key image containing only a portion of the generated cryptography string, and transmit the generated key image to a smart terminal owned by a user and the encrypted image to a display device when receiving an authentication request;
 the display device configured to display the encrypted image received from the authentication server; and
 the smart terminal configured to store the key image received by the authentication server, extract an encrypted area from the encrypted image when the encrypted image displayed on the display device is input via a camera by detecting corners and edges included in the encrypted image using an edge detection algorithm including Laplacian masking, color detection, and color change detection, and display an authentication code obtained by overlaying the extracted encrypted area with the key image,
 wherein the smart terminal is further configured to:
  detect slope, rotation, and warping of the detected corners and edges;
  calibrate the slope, the rotation, and the warping of the detected corners and edges into slope, rotation, and warping of the key image;
  detect calibrated corners and edges in the encrypted image input from the camera according to a result of the calibration;
  connect all of the calibrated edges and corners; and
  extract only an inner area of the connected corners and edges as an encryption area by filtering an outer area of the connected edges and corners.

12. The system of claim 11, wherein the smart terminal includes:
 a communication module configured to receive, from the authentication server, a key image in which a user's individual cryptography string generated by an authentication server is separated and transmit a user authentication request signal to the authentication server;
 an image processing module configured to receive an encrypted image displayed on a display device from a camera provided with the smart terminal after transmitting the user authentication request signal, extract an encrypted area from the received encrypted image, and convert the extracted encrypted area in such a manner as to correspond to the key image in shape and size to overlay the converted encrypted area with the key image pre-stored in a smart terminal; and
 a display module configured to display an authentication code shown in an area where the encrypted area is overlaid with the key image,
 wherein the communication module, the image processing module, and the display module are each implemented via at least one processor.

13. The system of claim 12, wherein the image processing module includes:
 an adjustment unit configured to scale the extracted encrypted area in such a manner as to be same as the pre-stored key image in shape and size and, so that a corner of the key image and a corner of the encrypted area correspond to each other and a border line of the key image and a border line of the encrypted area correspond to each other,
 wherein the adjustment unit is implemented via at least one processor.

14. The system of claim 11, wherein, when the camera of the smart terminal is operated such that the encrypted image of the display device is detected by the camera as a subject, the image processing module extracts the encrypted area by performing autofocusing on the encrypted image detected by the camera and overlays the extracted encrypted area with the pre-stored key image, thereby providing the authentication code to a user.

* * * * *